United States Patent [19]
Mogamiya et al.

[11] Patent Number: 5,220,433
[45] Date of Patent: Jun. 15, 1993

[54] STILL VIDEO APPARATUS INCLUDING PICTURE AND SOUND FADING

[75] Inventors: Makoto Mogamiya; Nobuhiro Tani, both of Tokyo, Japan

[73] Assignee: Asahi Kogaku Kogyo Kabushiki Kaisha, Tokyo, Japan

[21] Appl. No.: 701,319

[22] Filed: May 17, 1991

Related U.S. Application Data

[63] Continuation-in-part of Ser. No. 606,927, Oct. 31, 1990, abandoned.

[30] Foreign Application Priority Data

Oct. 31, 1989 [JP] Japan .................................. 1-284210
Oct. 31, 1990 [JP] Japan .................................. 2-294573

[51] Int. Cl.[5] .............................................. H04N 9/79
[52] U.S. Cl. ............................ 358/310; 358/182; 358/185; 358/335; 358/22

[58] Field of Search ................ 358/182, 183, 185, 210, 358/310, 335, 906, 909, 22; 360/14.1, 14.2, 14.3, 35.1

[56] References Cited

U.S. PATENT DOCUMENTS 4,739,417  4/1988  Ogawa .................................. 358/310
4,858,012  8/1989  Hiso et al. ........................ 358/906 X Primary Examiner—Robert L. Richardson
Attorney, Agent, or Firm—Sandler Greenblum & Bernstein

[57] ABSTRACT

A still video apparatus in which a picture of an object and a sound recorded on a recording medium as an electrical picture signal and sound signal are reproduced. The still video apparatus includes a picture reproducing device which reproduces the picture signal and the sound signal recorded on the recording medium, a picture fading device which fades the picture signal reproduced by the picture reproducing device, and a sound fading device which fades the sound signal reproduced by the picture reproducing device.

18 Claims, 7 Drawing Sheets

STILL VIDEO APPARATUS INCLUDING PICTURE AND SOUND FADING

This application is a continuation-in-part of application Ser. No. 07/606,927, filed Oct. 31, 1990, now abandoned.

BACKGROUND OF THE INVENTION

1. Field of the Invention

The present invention relates to a still video apparatus which reproduces picture signals and/or sound signals recorded on a magnetic disc.

2. Description of the Related Art

Still video apparatuses, such as still video cameras or still video player's which record or reproduce an image of a picture and a sound as electrical signals (picture signals and sound signals) on and from a magnetic disc (video floppy), are available on the market.

In a known still video player, a picture signal for one frame (one picture plane) is recorded on one track (in case of field recording) or two tracks (in case of frame recording) of a magnetic disc by a magnetic head. Upon reproducing the recorded picture signals, every frame of recorded picture signals is reproduced from the predetermined one track or two tracks by the magnetic head. Similar to the picture signal, the sound signal for one track is recorded and reproduced, using the tracks for the picture signals. Namely, the magnetic head in the still video player is moved through a unit of displacement corresponding to one track or two tracks for each frame to reproduce the recorded picture signals for every frame or the recorded sound signals for every track in order to output the reproduced signals to respective external output terminals.

Upon copying the reproduced signals of the still video player onto another recording medium, such as a video tape, the picture signals and/or the sound signals are recorded on the video tape in such a way that the signals suddenly appear and disappear. Consequently, when the video tape is reproduced, a viewer tends to feel unnatural or strange.

Furthermore, the same is true when the sound signals recorded on another device, for example a CD (Compact Disc) player, are copied together with the picture signals recorded on the still video player on a video tape.

SUMMARY OF THE INVENTION

The primary object of the present invention is to provide a still video apparatus in which no viewer feels unnatural or strange upon reproducing the recorded picture signals, and/or sound signals especially at the commencement or completion of the reproduction due to discontinuous reproduction To achieve the object mentioned above, according to the present invention, there is provided a still video apparatus in which a picture of an object is recorded on a recording medium as an electrical picture, signal is reproduced. The still video apparatus comprises a picture reproducing device for reproducing the picture signal recorded on the recording medium, a picture fading device for fading the Picture signal reproduced by the picture reproducing device, and a sound fading device for fading an external sound signal input thereto.

With this arrangement, since the picture plane gradually changes (fade-in, fade-out) at the commencement and the completion of the reproduction of the picture signals and the sound signals, the picture naturally and continuously appears and disappears.

Preferably, the provision is made to an interval reproduction device, so that upon interval reproduction, the sound fading device and the picture fading device can synchronously fade the sound signals and the picture signals at the commencement and completion of the reproduction. Consequently, even if the picture signals of an object to be taken are reproduced at a predetermined time interval, the change of the sound and picture smoothly and continuously takes place, thus resulting in enhanced picture and acoustic effects.

BRIEF DESCRIPTION OF THE DRAWINGS

The invention will be described below in detail with reference to the accompanying drawings, in which.

DESCRIPTION OF THE PREFERRED EMBODIMENTS

The present disclosure relates to subject matter contained in Japanese patent application No. 01-284210 (filed on Oct. 31, 1989) which is expressly incorporated herein by reference in its entirety. The present disclosure relates to subject matter contained in Japanese patent application No. 02-294573 (filed Oct. 31, 1990) which is expressly incorporated herein by reference, in its entirety.

Figure 1:
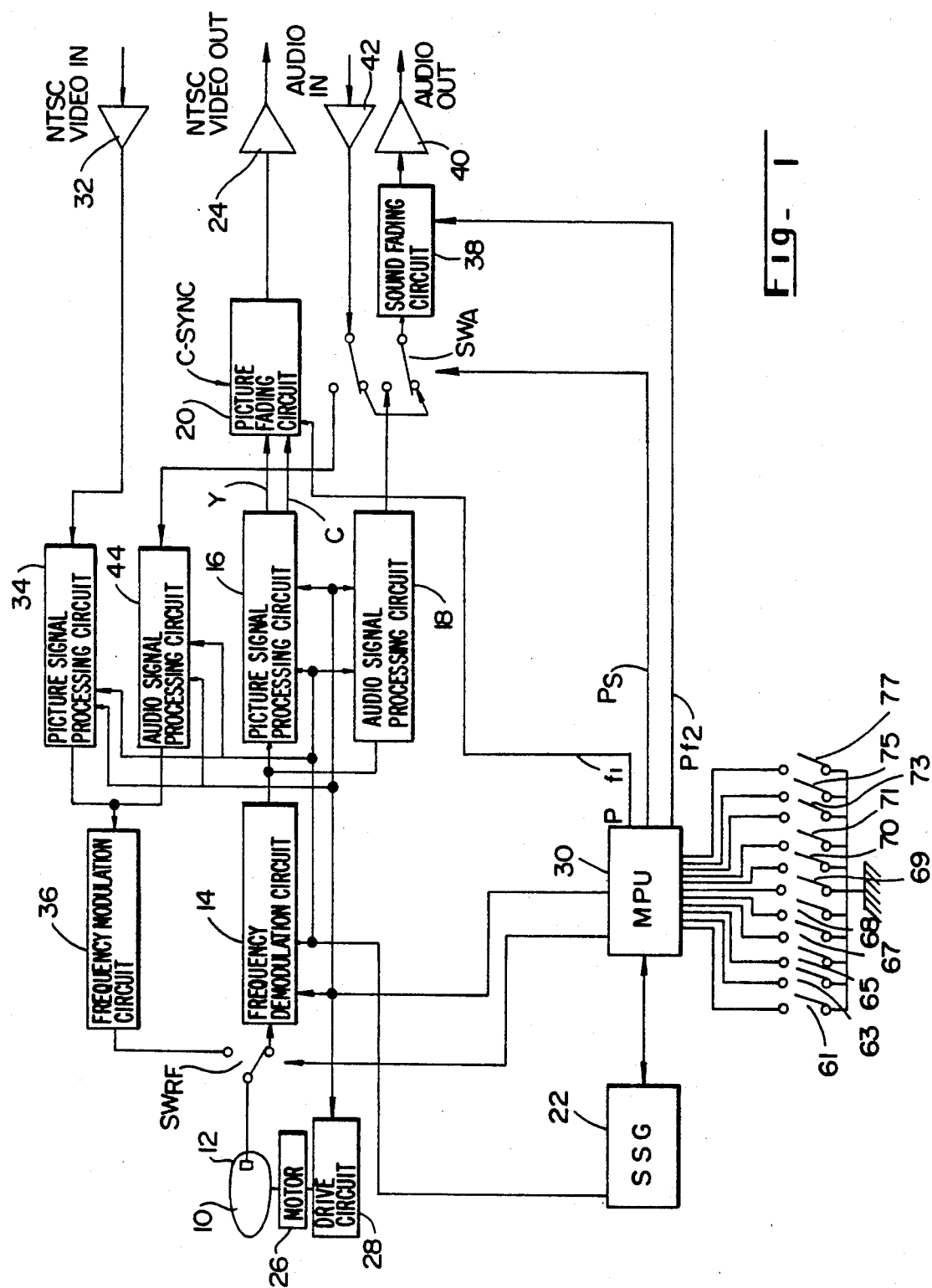
FIG. 1 is a block diagram of a control circuit incorporated in a still video player according to an embodiment of the present invention.

The following discussion will be first directed to a reproducing function of picture signals with reference to FIG. 1, which shows a block diagram of a control circuit of a still video player according to the present invention.

The picture signals (sound signals) which are modulated in frequency and recorded magnetic disc 10 are read by a magnetic head 12 and outputted to a frequency demodulation circuit (FM-demodulation circuit) 14 through an electronic record/reproduction selecting switch SWRF. The FM-demodulation circuit 14 demodulates the modulated picture signals or sound signals and outputs the demodulated signals to a picture signal processing circuit 16 or a sound signal processing circuit 18.

The picture signal processing circuit 16 separates and outputs the picture signals to a picture fading circuit 20 as luminance signals Y and color difference signals C.

The picture fading circuit 20 performs the fade-in process of the luminance signals Y and the color difference signals C at the commencement of the reproduction and mixes the faded-in luminance and color difference signals and the synchronous signals (C-SYNC), outputted from a SSG (Synchronizing Signal Generator) circuit 22, and outputs composite video signals to a video output terminal 24. After the fade-in process over a predetermined time is completed, the picture fading circuit 20 directly outputs the composite video signals without fading them. Upon the completion of the reproduction, the picture fading circuit 20 performs the fade-out process and finishes the output of the video signals. The fading operation of the picture fading circuit 20 is controlled in accordance with a fading control signal Pf1 output from an MPU 30 which will be discussed below.

The magnetic disc 10 is driven (rotated) at a predetermined revolution rate by a spindle motor 26 which is in turn driven and controlled by a drive circuit 28. The tracking operation of the spindle motor 26 and the magnetic head 12 is controlled by a MPU (Microcomputer Processing Unit) 30.

A picture recording circuit of the present invention is constructed and operates as follows.

The video signals outputted from an external video device are inputted to a picture signal processing circuit 34 through a video input terminal 32. The picture signal processing circuit 34 divides the video signals into luminance signals and color difference signals and adds a predetermined DPSK (Differential Phase Shift Keying) signal to the luminance signals and color difference signals to output them to a frequency modulation circuit (FM-modulation circuit) 36.

The FM-modulation circuit 36 modulates the output signals and outputs them to the magnetic head 12 through the record/reproduction selecting switch SWRF, so that the signals are recorded on the magnetic disc 10 through the magnetic head 12 as multiple signals.

The following discussion will be addressed to a sound signal processing circuit.

The modulated sound signals recorded on the magnetic disc 10 are read by the magnetic head 12 and are outputted to the FM-demodulation circuit 14 through the record/reproduction selecting switch SWRF, so that the demodulated signals are outputted to the sound signal processing circuit 18, similar to the picture signals.

In the sound signal processing circuit 18, the compressed time axis of the sound signals is extended again to produce sound signals having a time axis the same as that of the original sound signals. The sound signals are outputted to a sound signal fading circuit 38 through a sound input/output switching switch SWA.

The sound signal fading circuit 38 performs the fade-in process of the sound signals at the commencement of the reproduction, prior to the output of the sound signals to the sound signal output terminal 40. Also, at the end of the reproduction, the sound signal fading circuit 38 performs the fade-out process of the sound signals and finishes the output of the sound signals to the sound signal output terminal 40. The fading operation of the sound fading circuit 38 is controlled in accordance with a fading control signal Pf2 output from the MPU 30.

The sound signals from an external audio device are inputted to the sound signal fading circuit 38 or the sound signal processing circuit 44 from the sound signal input terminal 42 through the sound input/output switching switch SWA.

The sound signal fading circuit 38 performs the fade-in process and fade-out process of the sound signals from the audio device through the sound signal input terminal 42 and the sound input/output switching switch SWA at the commencement of the reproduction and at the end of the reproduction, prior to the output of the sound signals to the sound signal output terminal 40, respectively.

The sound signal processing circuit 44 compresses the time axis of the sound signals and outputs the sound signals to the FM-modulation circuit 36. The FM-modulation circuit 36 modulates the sound signals having the compressed time axis to record the sound signals onto the magnetic disc 10 by the magnetic head 12 through the record/reproduction selecting switch SWRF.

The operations of the FM-demodulation circuit 14, the picture signal processing circuit 16, the sound signal processing circuit 18, the picture fading circuit 20, the sound signal processing circuit 34, the FM-modulation circuit 36 and the sound signal fading circuit 38, and the switching operations of the record/reproduction selecting switch SWRF and the sound switching switch SWA are all generically controlled by the MPU 30. The MPU 30 has a function as a fading control means for synchronously actuating the fading circuits 20 and 38.

Figure 2:
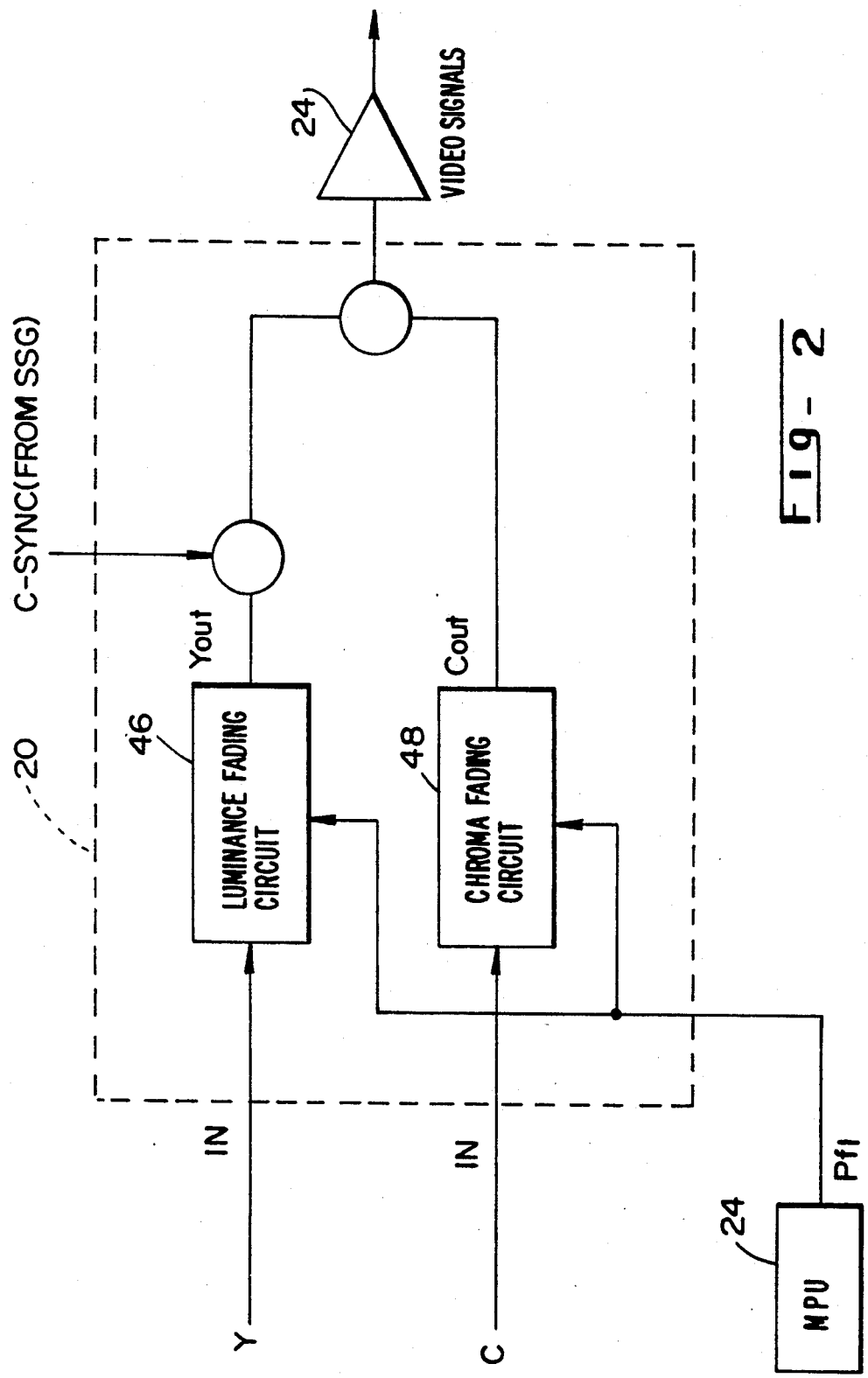
FIG. 2 is a block diagram of a picture fading circuit in a control circuit shown in FIG. 1.

FIG. 2 shows the picture fading circuit 20 in more detail. The picture fading circuit 20 has a luminance fading circuit 46 for fading the luminance signal Y and a chroma fading circuit 48 for fading the color signal (chromatic signal) C.

The luminance fading circuit 46 and the chroma fading circuit 48 include electronic attenuators therein, so that the attenuation ratio of the attenuators is gradually decreased and increased at the fade-in and the fade-out, respectively. The attenuators are controlled in accordance with the pulses Pf1 outputted from the MPU 30. The luminance signals Y and the color signals C outputted by the luminance fading circuit 46 and the chroma fading circuit 48 are mixed with the synchronous signals (C-SYNC) outputted from the SSG circuit 22, respectively to produce and output the composite video signals to the video output terminal 24.

It is possible to fade the picture signals in various ways; for example, both the luminance signals and the color signals may be gradually faded; the luminance signals and the color signals may be faded at different speeds; or the fading of the luminance signals and the color signals may gradually take place from the center portion of the picture plane toward the circumferential portion thereof and vice versa. These modes are controlled by the MPU 30.

Figure 3:
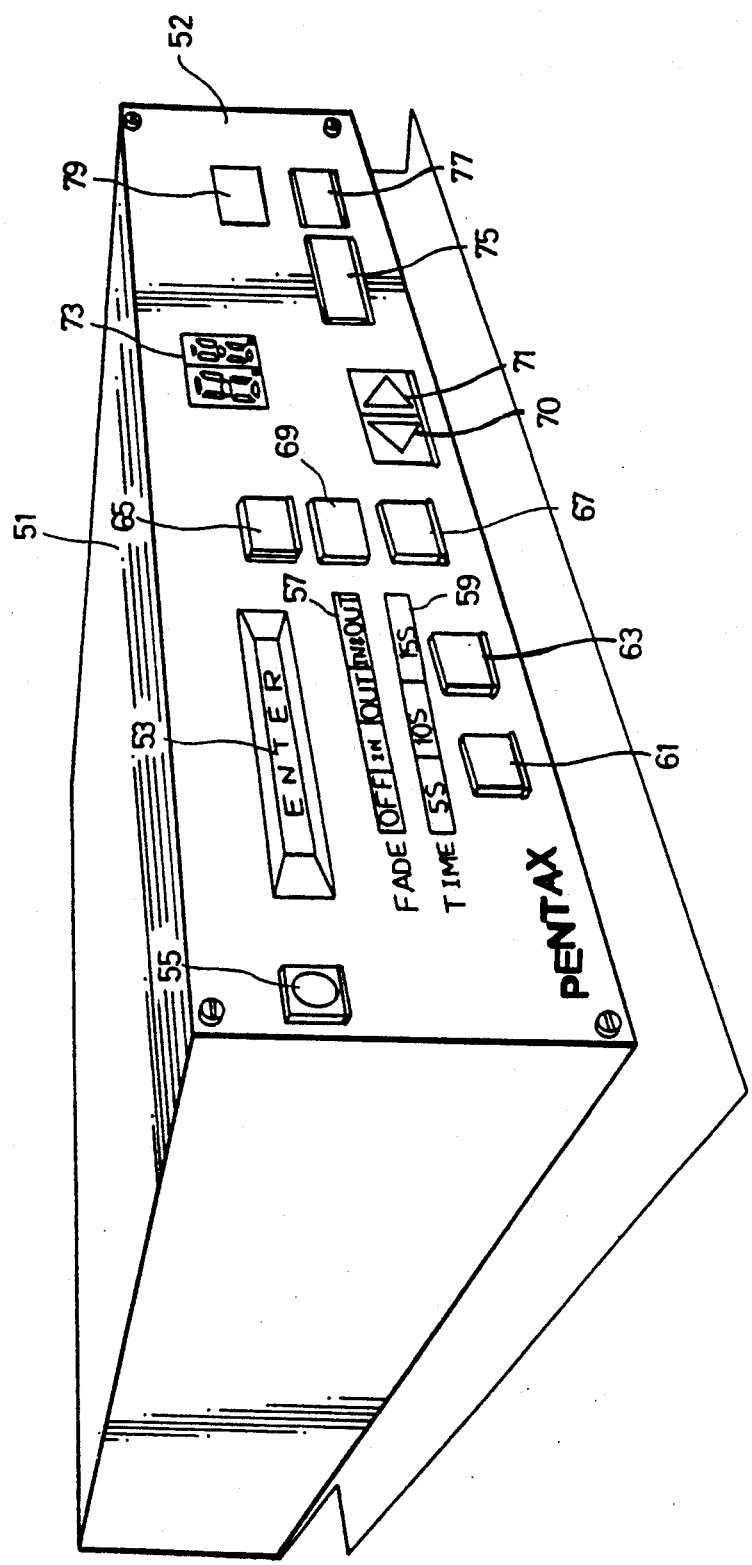
FIG. 3 is a perspective view of a still video player having a control circuit shown in FIG. 1.

FIG. 3 shows a still video player having the control circuit mentioned above.

In FIG. 3, a still video player body 51 has on its front panel 52 a display and operational switches. The player body 51 also has on its rear panel the video output terminal 24, the video input terminal 32, the sound output terminal 40 and the sound input terminal 42 (not shown in FIG. 3).

The front panel 52 is provided thereon with a floppy insertion window 53 through which the magnetic disc (video floppy) 10 is loaded in and unloaded from the video player, and a power switch 55 located on the left side of the floppy insertion window 53. Below the floppy insertion window 53 are provided a fading mode indicating panel 57 for indicating the selected fading mode, and a fading time indicating panel 59 for indicating the fading time. In the illustrated embodiment, there are four fading modes of "fade-off," "fade-in," "fade-out" and "fade-in and fade-out."

Also, in the illustrated embodiment, the fading time can be selected from three choices of 1 sec., 2 sec., and 3 sec. The fading mode and the fading time can be selected by actuating a fading mode selecting switch 61 and a fading time selecting switch 63, which are provided below the fading mode indicating panel 57 and the fading time indicating panel 59, respectively. Every time the fading mode selecting switch 61 is pushed down (turned ON), the fading mode successively changes from "fade-off"→"fade-in"→"face-out"→"fade-in, and fade-out" to "fade-off," in this order. In the fading mode indicating panel 57, the symbol "OFF," "IN," "OUT" or "IN OUT" is lightened corresponding to the selected fade mode.

An ejection switch 65 which is actuated to eject the loaded magnetic disc 10 from the floppy insertion window 53 is provided on the right side of the floppy insertion window 53. A Play switch 67 which is actuated to commence and stop the reproduction of the magnetic disc is provided below the floppy insertion window 53. When the play switch 67 is pushed down (turned ON), the reproduction is commenced, and when the play switch 67 is pushed down one more time, the reproduction is stopped.

A play mode selecting switch 69 is provided below the play switch 67 to switch the play modes between the reproduction mode and the record mode.

A down switch 70 and an up switch 71 are provided on the right side of the play mode selecting switch 69. When the down switch 70 or the up switch 71 are turned ON (pushed down), the track number of the magnetic disc to be reproduced is successively decreased or increased one by one, respectively. The track number is indicated in the track number indicating panel 73 provided above the switches 70 and 71.

An interval reproduction switch 75 is provided on the right side of the up switch 71 to reproduce a plurality of continuous frames over a predetermined time interval. A timer setting switch 77 is provided on the right side of the interval reproduction switch 75 to set a reproduction time for one frame. Also upon reproducing the recorded picture over a predetermined time interval (interval reproduction) by the operation of the interval reproduction switch 75, the timer setting switch 77 can set a reproduction time for one frame. The reproduction time for one frame is twice the time set by the fade time selecting switch 63 when the "IN & OUT" fade mode is selected (i.e., when both the fade-in process and the fade-out process are performed). The reproduction time is identical to the time set by the fade time selecting switch 63 when either the "IN" or the "OUT" fade mode is selected (i.e., when only one of the fade-in and fade-out processes is performed).

A sound input switching switch 79 is provided above the timer setting switch 77 to switch the sound switching switch SWA, so that when the sound input switching switch 79 is turned ON, e sound switching switch SWA connects the sound input terminal 42 to the sound signal fading circuit 38. Conversely,, when the sound input switching switch 79 is turned OFF, the sound switching switch SWA connects the sound input terminal 42 to the sound signal processing circuit 44 and connects the sound signal processing circuit 18 to the sound signal fading circuit 38.

The above-mentioned switches 61, 63, 65, 67, 68, 69, 70, 71, 73, 75, and 77 are connected to the MPU 30. The indication of the fade mode indicating panel 57, the fade time indicating panel 59 and the track number indicating panel 73 are controlled by the MPU 30.

The following description will be directed to the operation of the still video player as mentioned above while referring to FIGS. 4 and 5.

Figure 4:
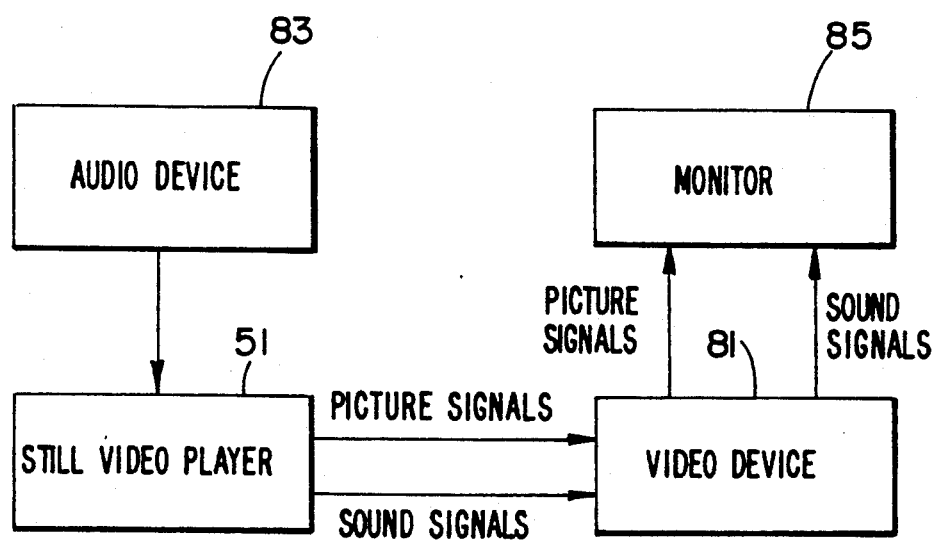
FIG. 4 is a block diagram Of a still video system including a still video player shown in FIG. 3.

An embodiment shown in FIG. 4 is applied to a still video system in which a picture taken by a still video camera is recorded onto a video tape synchronously with the sound, such as a narrator's voice or a BGM output from an external audio device.

A picture input terminal and a sound input terminal of for example a video device 81, such as a video deck, are connected to the video output terminal 24 and the sound output terminal 40 of the still video player 51, respectively. An output terminal of for example an audio device 83, such as a cassette tape deck or a CD player, etc., is connected to the sound input terminal 42 of the still video player 51. The picture output terminal and the sound output terminal of the video device 81 are connected to the picture input terminal and the sound input terminal of a television 85 as a monitor, respectively.

Figure 5:
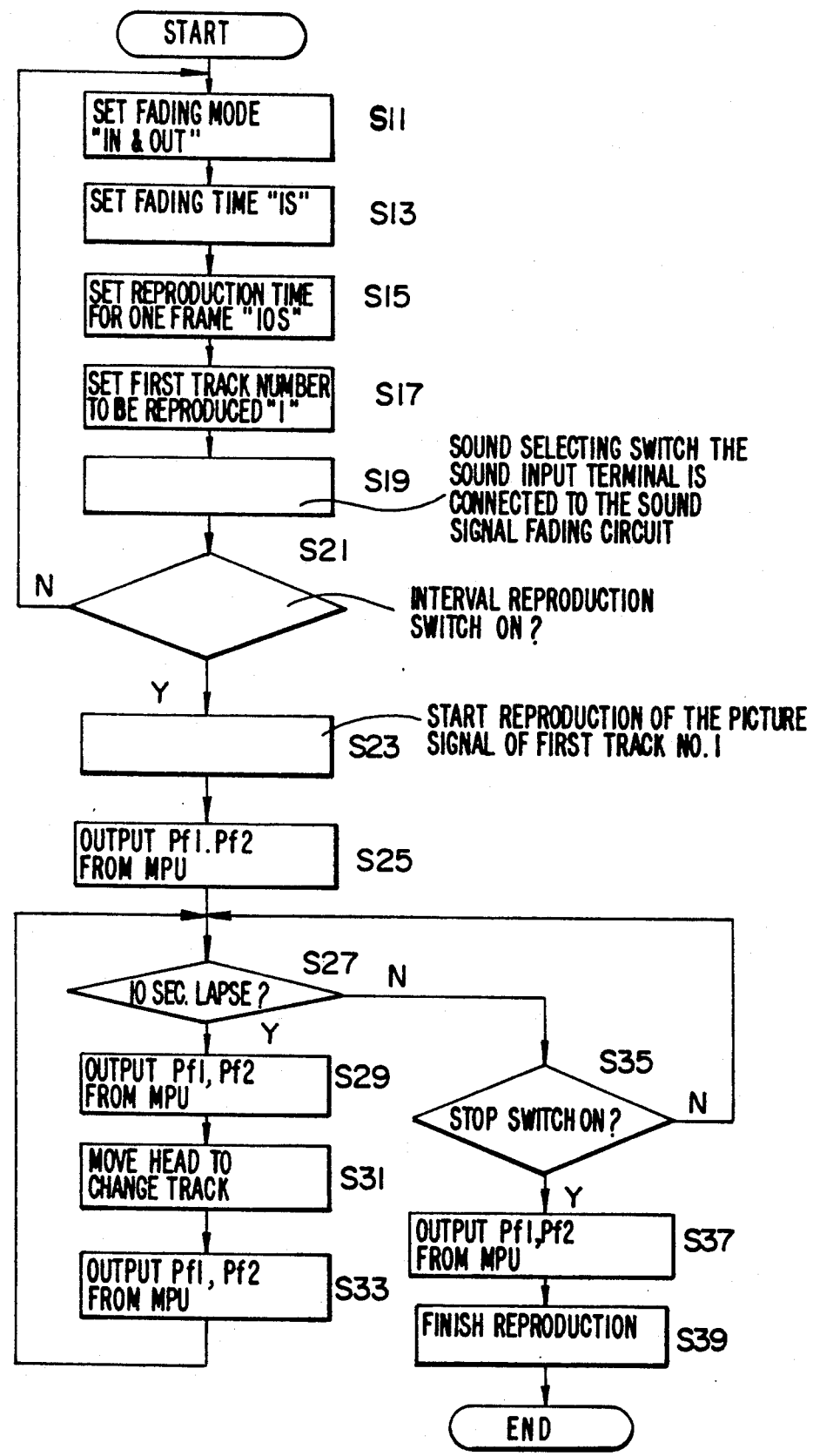
FIG. 5 is a flow chart of operations of a still video system shown in FIG. 4.

FIG. 5 shows a flow chart of the copying (dubbing) operation in a still video apparatus according to the present invention. This operation is controlled in accordance with the program stored in a memory of the MPU 30.

An operator actuates the play mode selecting switch 69 to select the reproduction mode for the interval reproduction operation and the dubbing operation. Thereafter, the setting operations for the fading and the interval reproduction are performed. Namely, the fading mode is selected by the fading mode selecting switch 61, the fading time is selected by the fading time selecting switch 63, the reproduction time for one frame is selected by the timer setting switch 77, a first track with which the reproduction begins is selected by the down and up switches 70 and 71, and the external input sound signal is switched to make the fading possible by the sound selecting switch 79, respectively.

The MPU 30 commences the operations of the flow chart shown in FIG. 5 when the reproduction mode is selected by the play mode selecting switch 69. Upon operation of the switches, record and reproduction switch SWRf is switched to the FM demodulation circuit 14, so that the fading mode, the fading time, the reproduction time for one frame, and the first track number to be reproduced are set, and the sound input terminal 42 is connected to the sound signal fading circuit 38 (through side), respectively (steps S11 through S19). In the illustrated embodiment, the default modes and values of the system are as follows: the fade-in and fade-out mode is selected, the fading time is 1 second, the reproduction time for one frame is 10 seconds, the first track No. to be reproduced is 1, and the external sound signal input and output mode is selected.

If the operator does not specify or select any of the above-mentioned modes and values when the initial mode is set in the MPU 30, the MPU 30 performs the operations in steps S11-S17 in accordance with the aforementioned default modes and values.

Thereafter, the operator actuates the audio device 83 and the video device 85 to commence the reproduction and the recording, and then makes the interval reproduction switch 75 ON to commence the interval reproduction.

When the interval reproduction switch 75 is made ON, the MPU 30 commences the reproduction of the picture signal of the first track No. 1 and outputs the fading control signals Pf1 and Pf2 to actuate the picture fading circuit 20 and the sound fading circuit 38 for one second. As a result, the sound signal fading-in operation and the picture signal fading-out operation are synchronously carried out (steps S23 and S25).

After the fading-in operation of both the picture and sound signals, normal reproduction is carried out without fading the signals in a so-called "through" operation until ten seconds set by the timer setting switch 77 lapse or until the stop switch 68 is pressed down (steps S27 and S35).

After the lapse of ten second set by the timer setting switch 77, the MPU 30 outputs only the fading out signal Pf1, so that only the picture signal is faded out by the picture fading circuit 20 (steps S27 and S29). The sound fading circuit 38 continues the through operation. Namely, in the interval reproduction in the illustrated embodiment, the picture signals are faded for every film frame, but the sound signals are faded only at the beginning and the end. Alternatively, it is possible to fade the sound signals for every frame synchronously with the picture signals.

The MPU 30 moves the magnetic head 12 to a subsequent track to cause the picture signal processing circuit 16, etc., to reproduce the picture signals recorded thereon and outputs the fading-in control signal Pf1, so that the picture fading circuit 20 fades the picture signals only (steps S31 and S33). The control continues until ten seconds lapse (steps S27 and S35). The operations mentioned above are repeated to smoothly connect the frames, so that a visually natural picture can be provided to a viewer.

When the above mentioned operations are repeated to the last frame, so that the reproduction of the last frame is completed (steps S27 through S35), the magnetic head 12 is moved to the first track to repeat the operations.

When the stop switch 68 is pushed down, the MPU 30 outputs the fading-out control signals Pf1 and Pf2, so that the picture fading circuit 20 and the sound fading circuit 38 synchronously perform the fading-out operations for one second and finishes the reproduction (steps S35 through S39). Consequently, the picture and sound of the last frame are smoothly and visually naturally faded out.

It is possible to skip the control to step S37 to complete the interval reproduction, upon completion of the reproduction of the terminal track.

Upon completion of the interval reproduction, the photographer stops the recording operation o the video device 81 and the reproduction operation of the audio device 83. Thus, a dubbing operation, to produce a video tape combining the picture signal by the interval reproduction and the external sound signals ends.

When the video tape thus produced is reproduced, the picture signal and the second signal are faded in. The picture is faded out and faded in upon completion of the reproduction of one frame and reproduction of a subsequent frame, respectively. When the reproduction of the last frame is finished, the picture and sound are faded out.

If the interval reproduction is commenced by the interval reproduction switch 67 when the fading-in mode or the fading-out mode is selected, the fading operation is carried out upon commencement or completion of the reproduction of each frame, in accordance with the selected mode.

As can be seen from the above discussion, in a still video player according to the present invention, since the picture signals and the sound signals are faded-in and faded-out at the commencement and completion of the reproduction and the switching of the frame to be reproduced, respectively, a smooth and natural stream of picture and sound is obtained. Also, upon edition using an external device, the fading effect can be easily utilized.

Although the above explanation has been directed to an embodiment applied to a still video player, the present invention can be applied to a still video camera.

Furthermore, it is possible to provide a memory in which the picture signals for at least one frame can be stored. In this case, if the stored picture signals are repeatedly reproduced while fading-in and fading-out the same, the pictures naturally change at the connection o the frames even upon dubbing while skipping the frames, so that a natural picture can be realized.

The following discussion will be directed to a picture fading circuit, a sound fading circuit, and a fading control circuit, by way of example, with reference to FIGS. 6 through 9.

In FIGS. 6 through 9, the elements corresponding to those shown in FIG. 1 are designated by the same reference numerals as those in FIG. 1.

Figure 6:
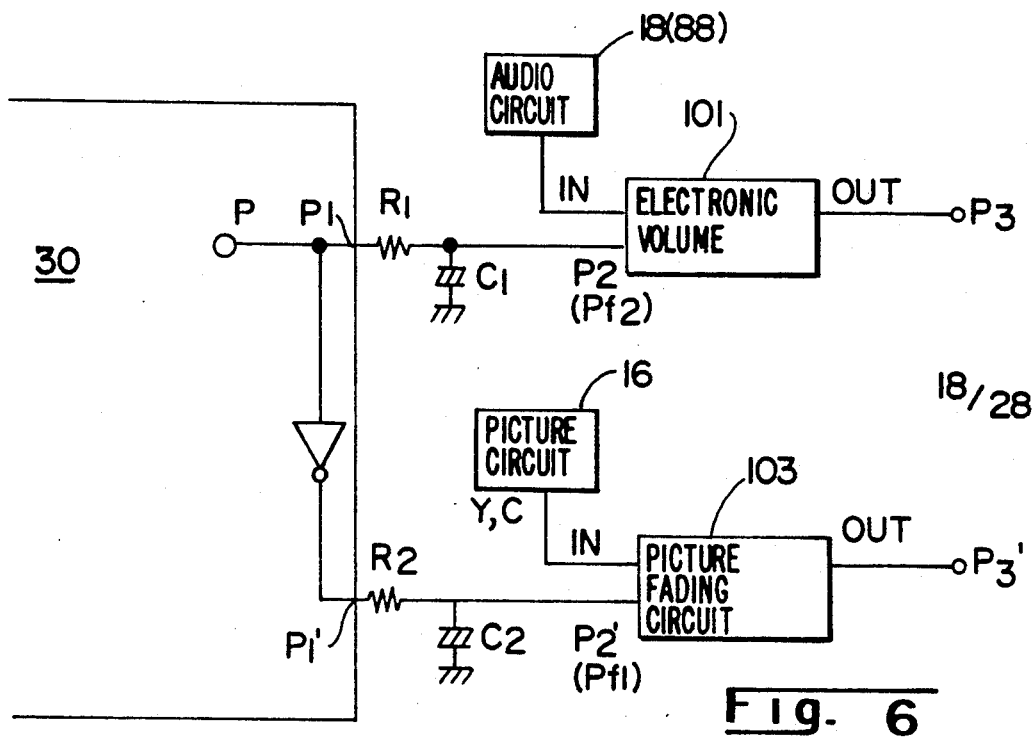
FIG. 6 is a block diagram of a picture fading circuit and a sound fading circuit according to an aspect of the present invention.

In a circuit arrangement shown in FIG. 6 the picture fading operation and the sound fading operation are simultaneously commenced. In the illustrated embodiment, the sound fading circuit is constituted by an electro volume 101. For example, an "M51523AL" of Mitsubishi Denki K.K. can be used as the electro volume 101. An "HA11776AMP" of Hitachi Seisakusho which is a picture encoder can be used as a picture fading circuit 103.

The audio circuit 18 is connected to a sound signal input terminal of the electro volume 101, and the picture signal processing circuit 16 is connected to a picture signal input terminal of the picture fading circuit 103, respectively. A fading control port P1 of the MPU 30 is connected to a fading control terminal of the electro volume 101 through a time constant circuit (delay circuit) consisting of a resistor R1 and a condenser C1. Similarly, a fading control port P1' of the MPU 30 is connected to a fading control terminal of the picture fading circuit 103 through a time constant circuit consisting of a resistor R2 and a condenser C2. In the MPU 30, the port P1' and the port P1 are connected to a common terminal P through an invertor and directly, respectively. Consequently, the levels of the ports F1' and P1 are opposite to each other.

Figure 7:
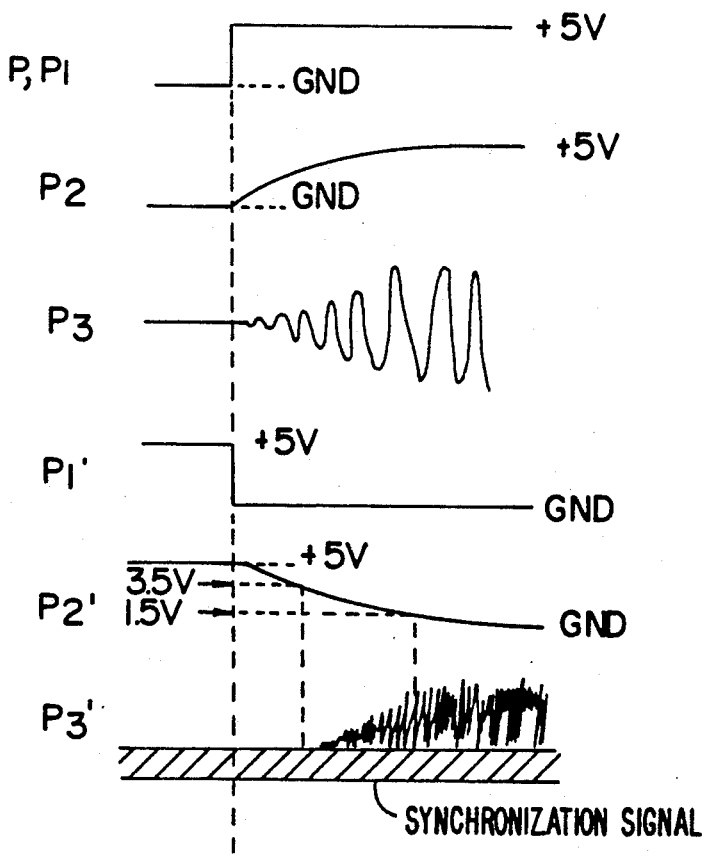
FIG. 7 is a timing chart of operations of a picture fading circuit and a sound fading circuit shown in FIG. 6.

The fading-in operation of the circuit shown in FIG. 6 is performed in accordance with the timing chart shown in FIG. 6 is performed in accordance with the timing chart shown in FIG. 7. Namely, the MPU 30 causes the level of the terminal P to be "L" (GND) before the commencement of the reproduction. In this state, the levels of the terminals P2 and P2' are "L" and "H", and the electro volume 101 and the picture fading circuit 103 substantially in an OFF state, respectively. Consequently, few sound and picture signals are output from the electro volume 101 and the picture fading circuit 103.

When the MPU 30 inverts the level of the common terminal P into "H", the levels of the ports P1 and P1' are gradually changed to "H" and "L" by the time constant circuit, respectively. As a result, the gains of the electro volume 101 and the picture fading circuit 103 are gradually increased. That is, the levels of the output signals and the output picture signals are gradually increased to be faded-in. Thus, when the common terminal P maintains a high level "H", the electro volume 101 and the picture fading circuit 103 are in a through state in which they have maximum gains.

After the fading-in operation ends, the MPU 30 maintains the common terminal at level "H". As a result, the levels of the electro volume 101 and the picture fading circuit 103 are held at a constant and high gain, similarly to the normal reproduction.

The MPU 30 causes the common terminal P to drop to level "L", upon fading-out, so that the levels of the ports P2 and P2' are gradually changed to levels opposite to those in the fading-in operation mentioned above by the time constant circuit. Thus, the gains of the electro volume 101 and the picture fading circuit 103 are gradually decreased to fade-out the picture signals.

The signals of the ports P2 and P2' in this embodiment correspond to the fading control signals Pf2 and Pf1 in FIG. 1, respectively. The time constants of the time constant circuits R1, C1 and R2, C2 are optional.

Namely, $R1 \cdot C1 = R2 \cdot C2$, or $R1 \cdot C1 \neq R2 \cdot C2$.

Figure 8:
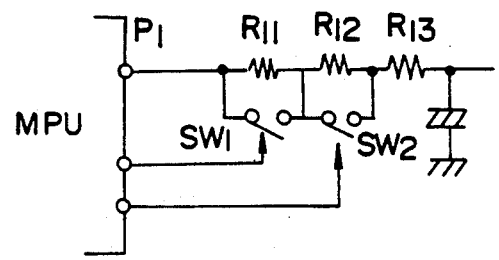
FIG. 8 is a circuit diagram of a time constant for varying three or four steps of a fading time, which can be applied to an embodiment shown in FIG. 6.

FIG. 8 shows a time constant circuit in which the fading time (time constant) is varied into three or four steps. It can be easily understood from FIG. 8 that there are four steps of fading times which can be controlled by varying the resistances R11, R12 and R13, and by making both the switches SW11 and SW12 ON and OFF or making only one of the switches SW11 and SW12 ON.

Figure 9:
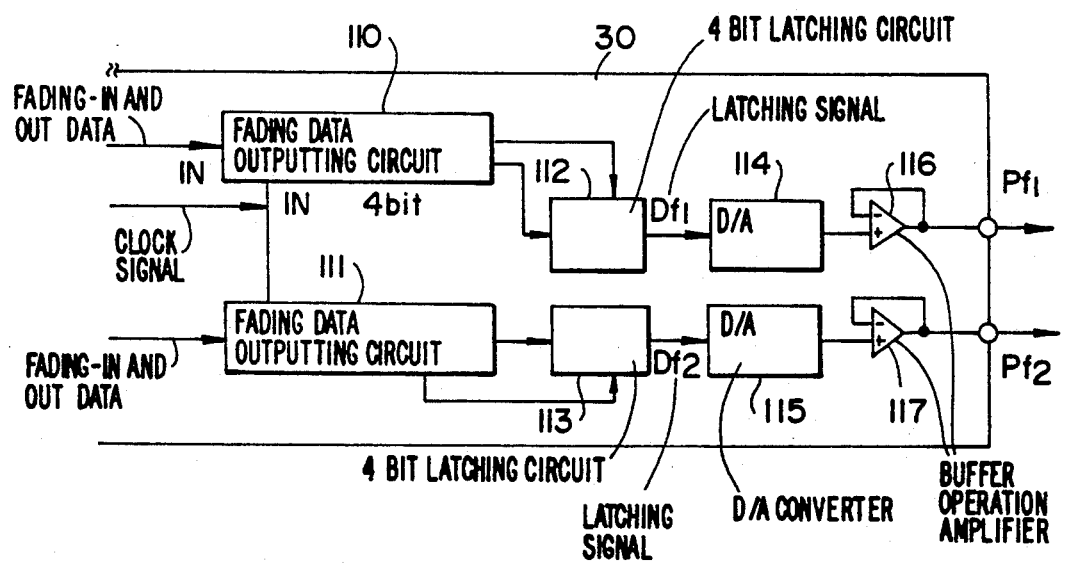
FIG. 9 is a block diagram of a control unit (MPU) which controls fading times of a picture fading circuit and a sound fading circuit shown in FIG. 6.

FIG. 9 shows a concrete circuit arrangement of the MPU 30 to control the fading time. The circuit is incorporated in the MPU 30.

The MPU 30 outputs gradually increasing serial data and gradually decreasing serial data corresponding to the fading modes to a pair of fading data outputting circuits 110 and 111 at a time interval corresponding to the fading time. For instance, when the picture signals and the sound signals are faded-in, the fading-in data is output to the fading data outputting circuits 110 and 111, and when the picture signals are only faded-in, the fading-in data is output only to the fading data outputting circuit 110.

The fading data outputting circuits 110 and 111 operate in accordance with the clock signals output from the control portion of the MPU 30.

The fading data received by the fading data outputting circuits 110 and 111 are latched by a pair of 4-bit latching circuits 112 and 113, respectively. The latching operations of the latching circuits 112 and 113 are controlled by the latching signals output form the fading data outputting circuits 110 and 111, respectively.

The 4-bit digital signals latched by the latching circuits 112 and 113 are converted to analogue signals by a pair of D/A converters 114 and 115, respectively, so hat the analogue signals are amplified by buffer operational amplifiers 116 and 117, respectively. The amplified signals are output as fading control signals Pf1 and Pf2 to the picture fading circuit 20 and the sound fading circuit 38, respectively. The picture fading circuit 20 and the sound fading circuit 38 output the picture signals and the sound signals at gains corresponding to the fading control signals Pf1 and Pf2.

Thus, in the fading-in operation, every time the fading-in data is input to the fading data outputting circuits 110 and 111, the levels of the fading control signals Pf1 and Pf2 vary, so that the picture fading circuit 20 and the sound fading circuit 38 perform the fading-in operation. Conversely, in the fading-out operation, every time the fading-out data is input to the fading data outputting circuits 110 and 111, the levels of the fading control signals Pf1 and Pf2 vary, so that the picture fading circuit 20 and the sound fading circuit 38 perform the fading-out operation.

As can be seen in FIG. 8, the fading of both the picture signals and the sound signals, only the picture signals, or only the sound signals, for example as shown at steps S25, S29, S33 and S37 in FIG. 5 are controlled by the fading control means.

As can be understood from the foregoing, in a still video player according to the present invention, since the picture signals and the sound signals are faded-out and faded-out at the commencement of the reproduction, the completion of the reproduction, the switching of the frames to be reproduced, a natural stream of picture and sound can be obtained. The fading effect can be easily utilized also upon edition using an external device.

Although the above explanation has been directed to an embodiment applied to a still video player, the present invention can be applied to a still video camera.

Furthermore, it is possible to provide a memory in which the picture signals for at least one frame can be stored. In this case, if the stored picture signals are repeatedly reproduced while fading-in and fading out the same, the pictures naturally change at the connection of the frames even upon dubbing while skipping the frames, so that a natural picture can be realized.

The times at which the fading of the picture signals and the sound signals commences is optional. For example, the fading of one of the picture signals and the sound signals can be delayed.

As can be seen from the above discussion, according to the present invention, since the picture signals and the sound signals are synchronously faded, when the picture signals and the sound signals are recorded on another recording medium, such as a video tape by the still video apparatus if only one frame is recorded, a picture and a sound of the frame smoothly appear and disappear, so that natural picture and sound can be reproduced, and if a plurality of frames are continuously recorded for a predetermined time interval, the picture and sound are continuously and smoothly connected between the adjacent frames, so that natural picture and sound can be also reproduced.

We claim:

1. A still video apparatus in which a picture of an object is recorded on a recording medium as an electrical picture signal adapted to be reproduced, comprising:
   picture reproducing means for performing a picture fade operation and for reproducing said picture signal recorded on the recording medium;
   picture fading means for fading said picture signal reproduced by the picture reproducing means;
   sound fading means for fading an external sound signal input into said still video apparatus;
   fade operation selecting means for selecting from a plurality of fade operations, wherein said fade operations include a through operation in which no fading is effected, a fade-in operation in which only the fade-in operation is effected, a fade-out operation in which only the fade-out operation is effected, and a fade-in/fade-out operation in which both the fade-in operation and the fade-out operation are effected.

2. A still video apparatus according to claim 1, further comprising a control means for synchronously controlling said picture fading means and said sound fading means.

3. A still video apparatus according to claim 1, wherein said picture signal includes a luminance signal and a color signal.

4. A still video apparatus according to claim 3, wherein said picture fading means comprises a luminance fading means for fading said luminance signal of said picture signal and a chroma fading means for fading said color signal.

5. A still video apparatus according to claim 4, wherein said luminance fading means and said chroma fading means independently fade said luminance signal and said color signal, respectively.

6. A still video apparatus according to claim 1, further comprising a fade time selecting means for setting a fade time of said fade operations selected by said fade operation selecting means.

7. A still video apparatus according to claim 1, wherein said recording medium is a magnetic disc.

8. A still video apparatus according to claim 1, wherein said picture signal reproducing means comprises an interval reproducing means for reproducing the picture signals of a plurality of pictures at a predetermined time interval.

9. A still video apparatus according to claim 8, wherein said picture fading means performs the picture fading operation at the commencement and the completion of the reproduction of said picture signals by said interval reproducing means.

10. A still video apparatus according to claim 9, wherein said sound fading means does not perform the fading operation during the picture fading operation by said picture fading means.

11. A still video apparatus according to claim 10, wherein said sound fading means and said picture fading means synchronously perform the respective fading operations at the commencement and the completion of the reproduction of the picture signals by said interval reproducing means.

12. A still video apparatus according to claim 9, further comprising a fade operation selecting means for selecting a plurality of fade operations by said picture fading means.

13. A still video apparatus according to claim 9, further comprising a fade operation selecting means for selecting a plurality of fade operations by said picture fading means and said sound fading means.

14. A still video apparatus according to claim 8, further comprising a timer setting means for setting a fade time of said picture fading operation of the picture signals by said interval reproducing means.

15. A still video apparatus in which a picture of an object and a sound are recorded on a recording medium as an electrical picture signal and a sound signal adapted to be reproduced, comprising:
picture reproducing means for reproducing said picture signal recorded on said recording medium;
picture fading means for fading said picture signal reproduced by said picture reproducing means;
sound reproducing means for reproducing said sound signal recorded on said recording medium;
sound fading means for fading said sound signal to be reproduced; and
means for generating a signal for ensuring synchronizing the fading of said picture signal by said picture fading means with the fading of said sound signal by said sound fading means.

16. A still video apparatus according to claim 15, further comprising a sound input means for inputting a sound signal from an external device, and wherein said sound fading means fades said sound signal from the external device.

17. The still video apparatus according to claim 15, further comprising a fade operation selecting means for selecting from a plurality of fade operations, wherein said fade operations include a through operation in which no fading is effected, a fade-in operation in which only the fade-in operation is effected, a fade-out operation in which only the fade-out operation is effected, and a fade-in/fade-out operations in which both the fade-in operation and the fade-out operation are effected.

18. A still video apparatus in which a picture of an object is recorded on a recording medium as an electrical picture signal adapted to be reproduced, comprising:
picture reproducing means for performing a picture fade operation and for reproducing said picture signal recorded on the recording medium;
picture fading means for fading said picture fading signal reproduced by said picture reproducing means;
sound fading means for fading an external sound signal inputted to said still video apparatus; and
control means for outputting a synchronization signal for ensuring the synchronization of fading of the picture signal by said picture fading means with fading of the external sound signal by said sound fading means.

* * * * *

UNITED STATES PATENT AND TRADEMARK OFFICE
CERTIFICATE OF CORRECTION

PATENT NO. : 5,220,433
DATED : June 15, 1993
INVENTOR(S) : M. MOGAMIYA et al.

It is certified that error appears in the above-indentified patent and that said Letters Patent is hereby corrected as shown below:

At column 12, line 35 (claim 17, line 8) change "operations" to --- operation---.

Signed and Sealed this

Twenty-third Day of January, 1996

Attest:

BRUCE LEHMAN

Attesting Officer        Commissioner of Patents and Trademarks